US010068268B2

(12) United States Patent
Yu et al.

(10) Patent No.: US 10,068,268 B2
(45) Date of Patent: Sep. 4, 2018

(54) TRANSACTION PROCESSING METHOD AND TRANSACTION PROCESSING SYSTEM USING COMMUNICATION DEVICE

(71) Applicant: Thinkware Systems Corporation, Seongnam-si, Gyeonggi-do (KR)

(72) Inventors: Hyun Joong Yu, Seongnam-si (KR); Won Jun Heo, Seongnam-si (KR); Jun Sik Kim, Seongnam-si (KR)

(73) Assignee: Thinkware Systems Corporation, Seongnam-si (KR)

( * ) Notice: Subject to any disclaimer, the term of this patent is extended or adjusted under 35 U.S.C. 154(b) by 1057 days.

(21) Appl. No.: 14/333,081

(22) Filed: Jul. 16, 2014

(65) Prior Publication Data

US 2015/0032561 A1    Jan. 29, 2015

(30) Foreign Application Priority Data

Jul. 26, 2013  (KR) ........................ 10-2013-0088872

(51) Int. Cl.
  *G06Q 30/00*    (2012.01)
  *G06Q 30/06*    (2012.01)
(52) U.S. Cl.
  CPC ................................ *G06Q 30/0601* (2013.01)
(58) Field of Classification Search
  CPC .................................................. G06Q 30/061
  USPC ..................................................... 705/26, 27
  See application file for complete search history.

(56) References Cited

U.S. PATENT DOCUMENTS

| 4,799,156 A * | 1/1989 | Shavit .................. G06Q 10/087 |
| | | 705/26.3 |
| 6,384,850 B1* | 5/2002 | McNally ........... G06F 17/30905 |
| | | 707/E17.121 |
| 8,860,587 B2* | 10/2014 | Nordstrom ............. G08G 1/202 |
| | | 340/990 |
| 9,066,206 B2* | 6/2015 | Lin ....................... H04W 4/023 |
| 2013/0027227 A1* | 1/2013 | Nordstrom ............. G08G 1/202 |
| | | 340/990 |
| 2013/0332279 A1* | 12/2013 | Kuusela ................. G06Q 30/02 |
| | | 705/14.57 |
| 2014/0011522 A1* | 1/2014 | Lin ....................... H04W 4/023 |
| | | 455/456.2 |

(Continued)

FOREIGN PATENT DOCUMENTS

| KR | 10-2010-0013596 A | 2/2010 |
| KR | 10-2010-0071470 A | 6/2010 |

(Continued)

OTHER PUBLICATIONS

Goers, Randy: Who's Checking in to Downtown Tampa? Planning 79.6: 36-39. American Planning Association. (Jul. 2013); ProQuest Dialog #1425515267; 8pgs.*

(Continued)

*Primary Examiner* — Robert M Pond
(74) *Attorney, Agent, or Firm* — Fenwick & West LLP

(57) ABSTRACT

Provided is a location-based transaction processing method and system using a communication device. The location-based transaction processing method may include providing information on a display frequency for each area displayed on a map service to a storekeeper terminal, and creating a market POI indicating a virtual marketplace of a storekeeper at a location selected by the storekeeper terminal based on the display frequency.

23 Claims, 9 Drawing Sheets

(56) References Cited

U.S. PATENT DOCUMENTS

2014/0040236 A1* 2/2014 Vijaywargi ......... G06F 17/3087
707/722
2014/0172553 A1* 6/2014 Goulart ............. G06Q 30/0251
705/14.49

FOREIGN PATENT DOCUMENTS

| KR | 10-2012-0064959 A | 6/2012 |
| KR | 10-1193535 B1 | 10/2012 |
| KR | 10-2013-0065877 A | 6/2013 |

OTHER PUBLICATIONS

Korean Intellectual Property Office, Office Action, Korean Patent Application No. 10-2013-0088872, dated Mar. 17, 2015, seven pages [with concise explanation of relevance in English].

* cited by examiner

TRANSACTION PROCESSING METHOD AND TRANSACTION PROCESSING SYSTEM USING COMMUNICATION DEVICE

CROSS-REFERENCE TO RELATED APPLICATION

This application claims the priority benefit of Korean Patent Application No. 10-2013-0088872, filed on Jul. 26, 2013, in the Korean Intellectual Property Office, the disclosure of which is incorporated herein by reference.

BACKGROUND

1. Field of the Invention

Embodiments of the present invention relate to technology for providing a virtual shopping space based on a location.

2. Description of the Related Art

In recent times, a global positioning system (GPS) is embedded within a smartphone that represents a mobile terminal. Also, for clarity, a location may be corrected over a third generation (3G) network or a wireless fidelity (Wi-Fi) network.

Such a location-based service may be simply utilized when a map service displays a location. Further, a variety of services converged with augmented reality are increasing. For example, Korea Registration Patent No. 10-1193535 discloses technology for providing a location-based service using augmented reality for a mobile communication service between users.

The number of Internet shopping mall services having been commercialized far ahead of a location-based service has been surprisingly increasing in a domestic market. With the development of the Internet, combinations of various Information technologies (ITs), financial products such as a variety of Internet payment services combined with such technologies, and transport services for quick delivery have been growing at a rapid pace.

Currently, the electronic commerce (e-commerce) market has been formed based on large online shopping malls. In addition, various types of e-commerce entities have been shifting their offline transactions to online transactions.

However, in reality, relatively small stores and transactions between individuals may be excluded from the fast-growing mobile industry or e-commerce transactions. In particular, the relatively small stores may be in poor circumstances in terms of a service of providing a user-oriented personalized shopping space.

SUMMARY

An aspect of the present invention provides a location-based transaction processing method and system that may easily open a virtual store and sell a product.

An aspect of the present invention also provides a location-based transaction processing method and system that may manage a virtual store as a personalized space.

An aspect of the present invention also provides a location-based transaction processing method and system that may be further easily accessible to a virtual store based on a location.

An aspect of the present invention also provides a location-based transaction processing method and system that may support a safe transaction using an on-air service.

According to an aspect of the present invention, there is provided a location-based transaction processing method, the method including providing information on a display frequency for each area displayed on a map service to a storekeeper terminal, and creating a market point of interest (POI) indicating a virtual marketplace of a storekeeper at a location selected by the storekeeper terminal based on the display frequency.

The providing of the information on the display frequency may include providing area ranking information according to the display frequency to the storekeeper terminal.

The location selected by the storekeeper terminal may be a virtual location that is sold to the storekeeper according to a sales policy based on the display frequency.

The location selected by the storekeeper terminal may be a virtual location irrespective of whether an offline store of the storekeeper is present or irrelevant to an actual location at which the offline store is located.

The transaction processing method may further include displaying information on the virtual marketplace through the market POI.

The creating of the market POI may include creating a panel corresponding to the virtual marketplace with respect to the market POI.

The panel may be a display area on which the storekeeper is capable of editing a display element.

The transaction processing method may further include displaying at least one of information on the virtual marketplace and product information registered by the storekeeper on the panel.

The transaction processing method may further include displaying, on a service screen based on a location received from a user terminal, the created market POI at a location adjacent to the received location.

The transaction processing method may further include displaying, on a service screen based on a location received from a user terminal, coupon information registered by the storekeeper at a location adjacent to the received location.

The transaction processing method may further include displaying, on a service screen based on a location received from a user terminal, the created market POI at a location adjacent to the received location, and displaying at least one of information on the virtual marketplace and product information registered by the storekeeper on the panel in response to a selection on the market POI through the user terminal.

The transaction processing method may further include receiving, from a user terminal, a selection on a panel displayable for the user terminal among panels created for the respective market POIs.

The transaction processing method may further include sharing location information between the storekeeper terminal and a terminal of a user having purchased a product in response to a success in a product purchase through a route using the market POI.

The transaction processing method may further include tracking a delivery location of a product and providing the tracked delivery location to a terminal of a user having purchased the product in response to a success in a product purchase through a route using the market POI.

Profits earned through the market POI may be differentially distributed based on a display frequency of a location at which the market POI is created.

According to another aspect of the present invention, there is provided a location-based transaction processing method, the method including receiving, from a service server, information on a display frequency for each area displayed on a map service, and displaying information on the display frequency, registering a location selected by a storekeeper to the service server based on the display frequency. Here, the service server may create a market POI indicating a virtual marketplace of the storekeeper at the location selected by the storekeeper based on the display frequency, and registering, to the service server, information on the virtual marketplace to be displayed through the market POI in response to an input of the storekeeper.

According to still another aspect of the present invention, there is provided a location-based transaction processing method, the method including transmitting a current location or a location input from a user to a service server; and receiving, from the service server, a service screen based on the current location or the location input from the user and a market POI to be displayed on the service screen, and displaying the market POI on the service screen. Here, the market POI may indicate a virtual marketplace of a storekeeper and is created by the service server at a location selected by the storekeeper based on a display frequency for each area displayed on a map service.

According to still another aspect of the present invention, there is provided a location-based transaction processing system, the transaction processing system including a provider configured to provide information on a display frequency for each area displayed on a map service to a storekeeper terminal, and a creator configured to create a market POI indicating a virtual marketplace of a storekeeper at a location selected by the storekeeper terminal based on the display frequency.

According to still another aspect of the present invention, there is provided a location-based transaction processing apparatus, the transaction processing apparatus including a transceiver configured to receive, from a service server, information on a display frequency for each area displayed on a map service, a controller configured to process information on the display frequency in a displayable form, and an input/output unit configured to display the processed information on the display frequency. Here, the transceiver may transfer, to the service server, a location selected by a storekeeper based on the display frequency according to a control of the controller, and the service server may create a market POI indicating a virtual marketplace of the storekeeper at the location selected by the storekeeper.

According to still another aspect of the present invention, there is provided a location-based transaction processing apparatus, the transaction processing apparatus including a transceiver configured to transmit a current location or a location input from a user to a service server, and to receive, from the service server, a service screen based on the current location or the location input from the user, a controller configured to process the received service screen in a displayable form, and an input/output unit configured to display the processed service screen. Here, the service server may create a market POI indicating a virtual marketplace of a storekeeper at a location selected by the storekeeper based on a display frequency for each area displayed on a map service, and the created market POI may be displayed on the service screen at a location adjacent to the current location or the location input from the user.

Effects

According to embodiments of the present invention, any user may easily open a virtual store and sell a product, and a storekeeper may decorate a store of the storekeeper to suit the taste of the storekeeper on a virtual space.

Also, according to embodiments of the present invention, information on a location corresponding to a relatively high display frequency on a map may be provided and thus, a storekeeper may select a virtual location and open a store at the location corresponding to the relatively high display frequency. Further, a differential profit distribution model based on a display frequency may be configured.

Also, according to embodiments of the present invention, a user may immediately verify products being sold around the user based on a location of the user. In addition, products may be sorted for each search or item and thus, the user may easily verify and purchase a desired product.

Also, according to embodiments of the present invention, in the case of performing a product transaction, it is possible to support a safe transaction using an on-air service. In detail, a service may be provided so that, in the case of a direct transaction, a seller and a purchaser may mutually verify mutual locations until a transaction is completed, and in the case of a delivery transaction, a location of a product being delivered may be verified on a map in real time.

Also, according to embodiments of the present invention, a service may be provided so that a user may immediately purchase an available coupon around a location of the user through a radar function based on the location of the user and may immediately search for a corresponding store.

BRIEF DESCRIPTION OF THE DRAWINGS

These and/or other aspects, features, and advantages of the invention will become apparent and more easily appreciated from the following description of embodiments, taken in conjunction with the accompanying drawings of which.

DETAILED DESCRIPTION

Figure 1:
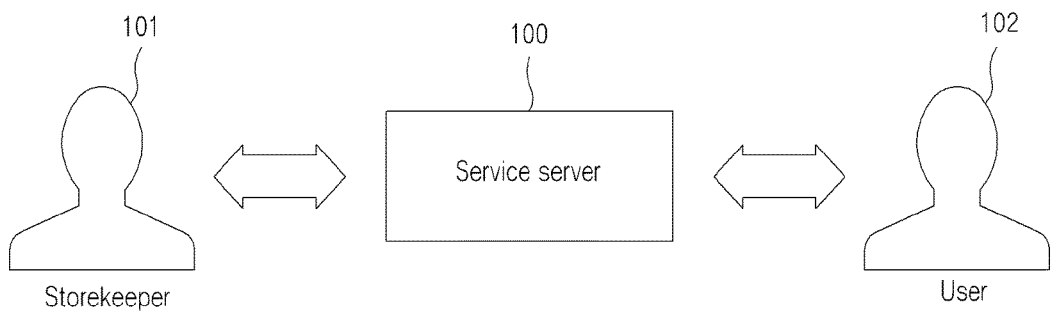
FIG. 1 illustrates a relationship among a storekeeper, a user, and a service server according to one embodiment.

Reference will now be made in detail to embodiments of the present invention, examples of which are illustrated in the accompanying drawings, wherein like reference numerals refer to like elements throughout. Embodiments are described below to explain the present invention by referring to the figures.

Embodiments of the present invention relate to location-based transaction processing technology that enable any user to easily open a virtual store and to purchase and sell a product through the virtual store.

FIG. 1 illustrates a relationship among a storekeeper, a user, and a service server according to an embodiment of the present invention. A storekeeper 101, a user 102, and a service server 100 are illustrated in FIG. 1. Here, the storekeeper 101 may refer to a storekeeper terminal substantially used by the storekeeper 101 and the user 102 may refer to a user terminal substantially used by the user 102. In addition, arrow indicators may indicate that data may be transmitted and received between a terminal used by the storekeeper 101 and the service server 100 and between a terminal used by the user 102 and the service server 100 over a wired/wireless network.

In the embodiments herein, the storekeeper 101 may refer to a businessman owning an online/offline store and also refer to an individual user that sells a product although the user does not own a store. The user 102 may refer to a personal user that is an entity that purchases a product of the storekeeper 101 as a service user. Here, the storekeeper terminal used by the storekeeper 101 and the user terminal used by the user 102 may refer to any type of terminal devices, for example, a personal computer (PC), a laptop computer, a navigation terminal, a smartphone, a tablet, a digital multimedia broadcasting (DMB) terminal, and a portable multimedia player (PMP).

The service server 100 serves as a service platform configured to provide a map service and a location-based service in a web environment and/or a mobile environment. Description related to general technical aspects of the map service and the location-based service will be omitted. For example, aspects about service platforms for providing a map through the Internet, finding a way, and finding a friend may be understandable by referring to the related art and thus, further description related thereto will be omitted.

According to one embodiment, the service server 100 may configure an open market service on a map for opening a virtual store at a location selected by the storekeeper 101 through a service platform, displaying virtual stores located around the user 102 for the user 102, and supporting a transaction between the storekeeper 101 and the user 102.

Figure 2:
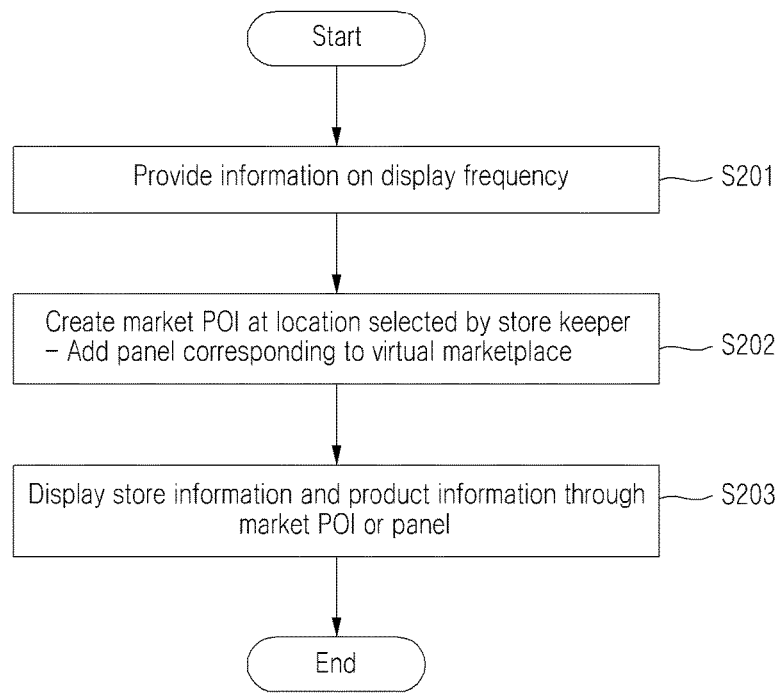
FIG. 2 is a flowchart illustrating a method of creating and displaying a virtual store at a service server according to one embodiment.

FIG. 2 is a flowchart illustrating a method of creating and displaying a virtual store at a service server according to one embodiment.

In operation S201, the service server 100 may provide information on a display frequency for each area displayed on a map service to a storekeeper terminal in response to a request of a storekeeper that is to open a virtual store. As an example, the service server 100 may accumulate a display frequency on a map service with respect to each of area units divided into administrative districts and may provide area ranking information based on the display frequency. As another example, the service server 100 may receive an input on at least one area desired by the storekeeper and may provide a frequency of a corresponding area displayed on a map service during a predetermined period of time. Also, the service server 100 may create and provide information regarding predetermined bidding processes performed among a plurality of storekeepers or the respective market points of interests (POIs) owned by storekeepers on a map, in order to enable a virtual store to be opened at a point corresponding to a relatively high display frequency on the map. Accordingly, a storekeeper may select a location at which the storekeeper is to open a virtual store of the storekeeper based on the display frequency for each area.

In operation S202, the service server 100 may create a market POI indicating a virtual marketplace of the storekeeper at a location selected by the storekeeper. Here, the service server 100 may create the market POI by classifying a transaction into a direct transaction or a store transaction. Here, the direct transaction may refer to a transaction that the storekeeper and a user directly meet with each other and purchase and sell a product, and the store transaction may refer to a transaction that the storekeeper and the user make a transaction through a predetermined procedure associated with a payment or a delivery.

In particular, the service server 100 may sell the location selected by the storekeeper to the storekeeper at predetermined commission according to a sales policy based on a display frequency of the selected location on the map service. According to the sales policy, a relatively high sales commission may be set according to an increase in the display frequency. A variety of methods, for examples, a sale by bidding and a prior sale, may be employed. Here, the location selected or purchased by the storekeeper may be a location that matches a current location of the storekeeper or an actual location at which an offline store of the storekeeper is located. Also, the location selected or purchased by the storekeeper may be a virtual location present only on a service, irrespective of whether the offline store of the storekeeper is present or irrelevant to the actual location at which the offline store is located.

According to one embodiment, when a location of a market POI is sold, it is possible to configure a profit distribution model for differentially distributing profits earned through the market POI based on a display frequency of the location of the market POI. Further, it is possible to configure a service model that enables the storekeeper to sell the location of the market POI owned by the storekeeper to another storekeeper. In detail, a store location transaction may be performed between storekeepers in such a manner that the storekeeper sells the location of the market POI owned by the storekeeper having a relatively high display frequency to another storekeeper at the cost of predetermined premium although the location of the owned market POI is a virtual location. Thus, according to one embodiment, it is possible to inform a storekeeper of an area having a relatively high display frequency on a map and to induce the storekeeper to open a store in the area having the relatively high display frequency. Also, it is possible to configure a profit distribution model for differentially distributing profits between a service provider and the storekeeper based on the display frequency.

Further, when creating the market POI, the service server 100 may create a panel corresponding to the virtual marketplace of the storekeeper with respect to the market POI. Each of service screens displayed on a storekeeper terminal and a user terminal refers to a panel. When creating the market POI of the storekeeper, the service server 100 may add a separate panel as the virtual marketplace of the storekeeper. Here, the panel corresponding to the virtual marketplace may be a panel in which the storekeeper is granted with an edition right and is allowed to perform personalization at the convenience of the storekeeper. The panel corresponding to the virtual marketplace may include a display area on which the storekeeper is capable of editing a display element, for example, a font and an object configuration. The storekeeper may register information (hereinafter, "store information") on the virtual marketplace, for example, a store type, a store name, a store location, an introduction image, and a main uniform resource locator (URL) address, product information, for example, a product name, a product image, a product price, and a product URL address, and/or coupon information through the panel assigned to the storekeeper. The storekeeper may arbitrarily decorate display elements displayed on the panel within a predetermined size.

The service server 100 may create and add a market POI and a panel of a storekeeper of a large store such as a social commerce company. Accordingly, the service server 100 may include, in a service, product information, for example, coupons and discount coupons, registered from various social commerce companies.

In operation S203, the service server 100 may provide information on the virtual marketplace to a user using the map service or the location-based service through a corresponding service platform. As an example, the service server 100 may display, on a service screen based on a location received from a user terminal, a created market POI at a location adjacent to the received location. In this example, in response to a selection of the user on a predetermined market POI among market POIs displayed on the service screen, the service server 100 may switch the service screen to a panel corresponding to the selected market POI, and may display at least one of store information and product information of the storekeeper on the panel. As another example, the service server 100 may display, on a service screen based on a location received from a user terminal, coupon information registered by a storekeeper at a location adjacent to the received location. For example, when a user uses a map screen of FIG. 7 based on a location of the user or a radar screen of FIG. 9, such as a screen for finding a friend or a peripheral POI, the service server 100 may display created market POIs or coupons on a corresponding service screen based on the location of the user. In this example, the service server 100 may also provide a route search service so that the user may immediately search for a location of a market POI or a coupon selected by the user. As described above, the service server 100 may display market POIs of storekeepers on various types of service screens. Here, the service server 100 may display the market POIs by applying various sorting criteria, for example, for each store type and for each area. Also, the service server 100 may display at least one of store information and product information of a storekeeper using a market POI or a corresponding panel with respect to a virtual marketplace.

The service server 100 may display a market POI or a panel that is directly selected by a user from among market POIs or panels created for the respective storekeepers and displayable on a user terminal. In detail, instead of displaying all the market POIs or panels, the service server 100 may receive a selection of the user on a desired market POI or panel, and may selectively display the selected market POI or panel. For example, the service server 100 may receive a selection of a user on a preferred store type and may display market POIs corresponding to the selected preferred store type. Also, when the user selects frequently visiting panels, the service server 100 may manage the selected panels as a separate list such as "favorites" and enables the user to view a desired panel from the list at any time.

The service server 100 may display information on products being sold by a storekeeper on various types of service screens and may also support a payment in interaction with a server of a financial company, for example, a bank and a card company if the user desires to purchase a product. In addition, when a product purchase is performed through a route using a market POI, for example, various types of service screens on which the market POI is displayed, or a panel of the market POI, the service server 100 may allow location information to be shared between a storekeeper terminal and a terminal of the user having purchased a product. Here, the service server 100 may set a sharing start time and a sharing end time of location information. For example, the service server 100 may allow location information to be shared between a storekeeper and a user during a period of time from a point in time at which a user payment is completed to a point in time at which a product is delivered to the user. Alternatively, the service server 100 may allow location information to be shared between the storekeeper and the user during a period of time directly set by the storekeeper or the user. Also, the service server 100 may track a delivery location of the product purchased by the user and may provide the tracked delivery location to the user terminal through an on-air service so that the user may verify the delivery location at any time.

Figure 4:
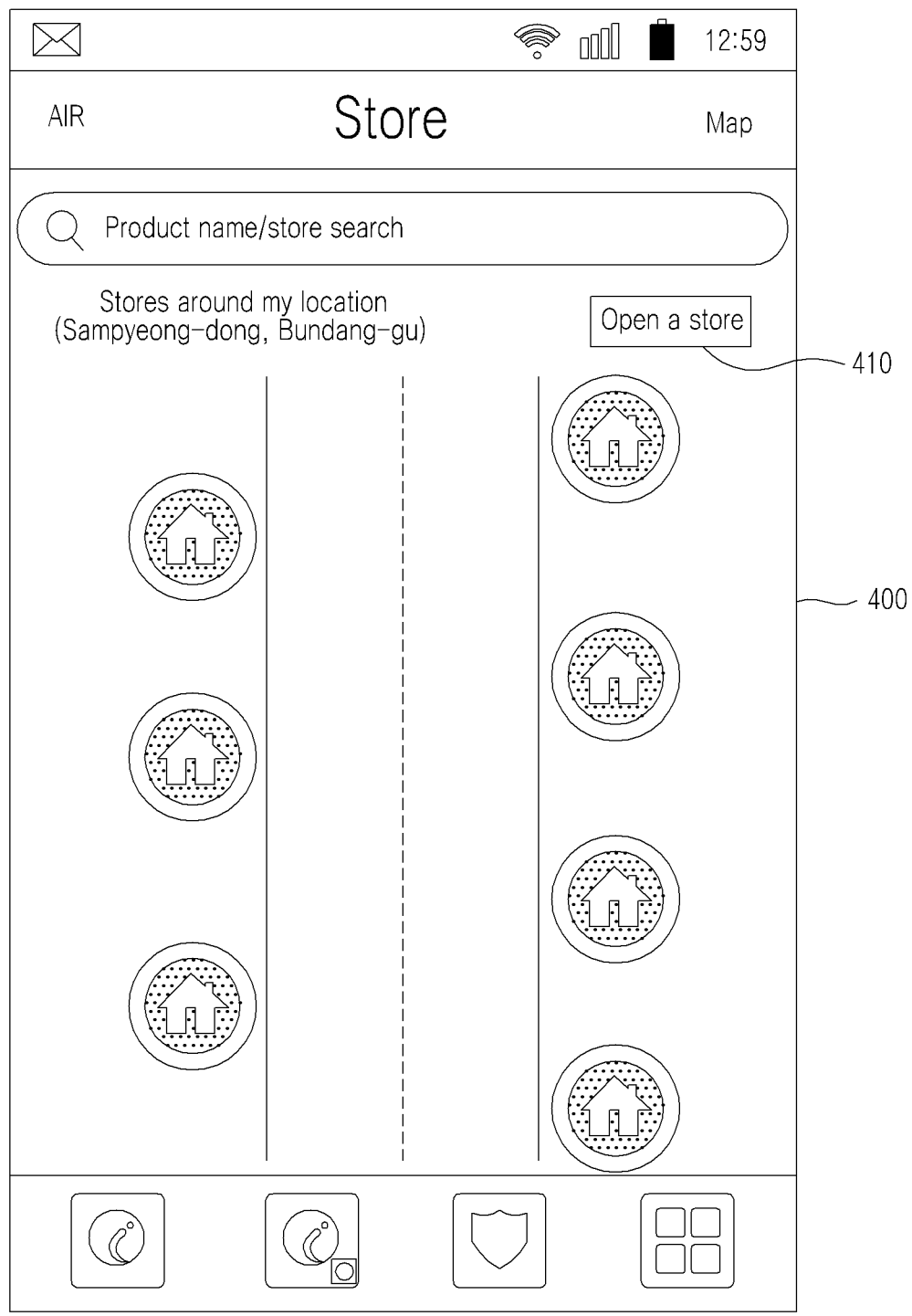
FIGS. 4 and 5 illustrate examples of a route for opening, by a storekeeper, a virtual store and a personalization-enabled panel according to one embodiment.
Figure 5:
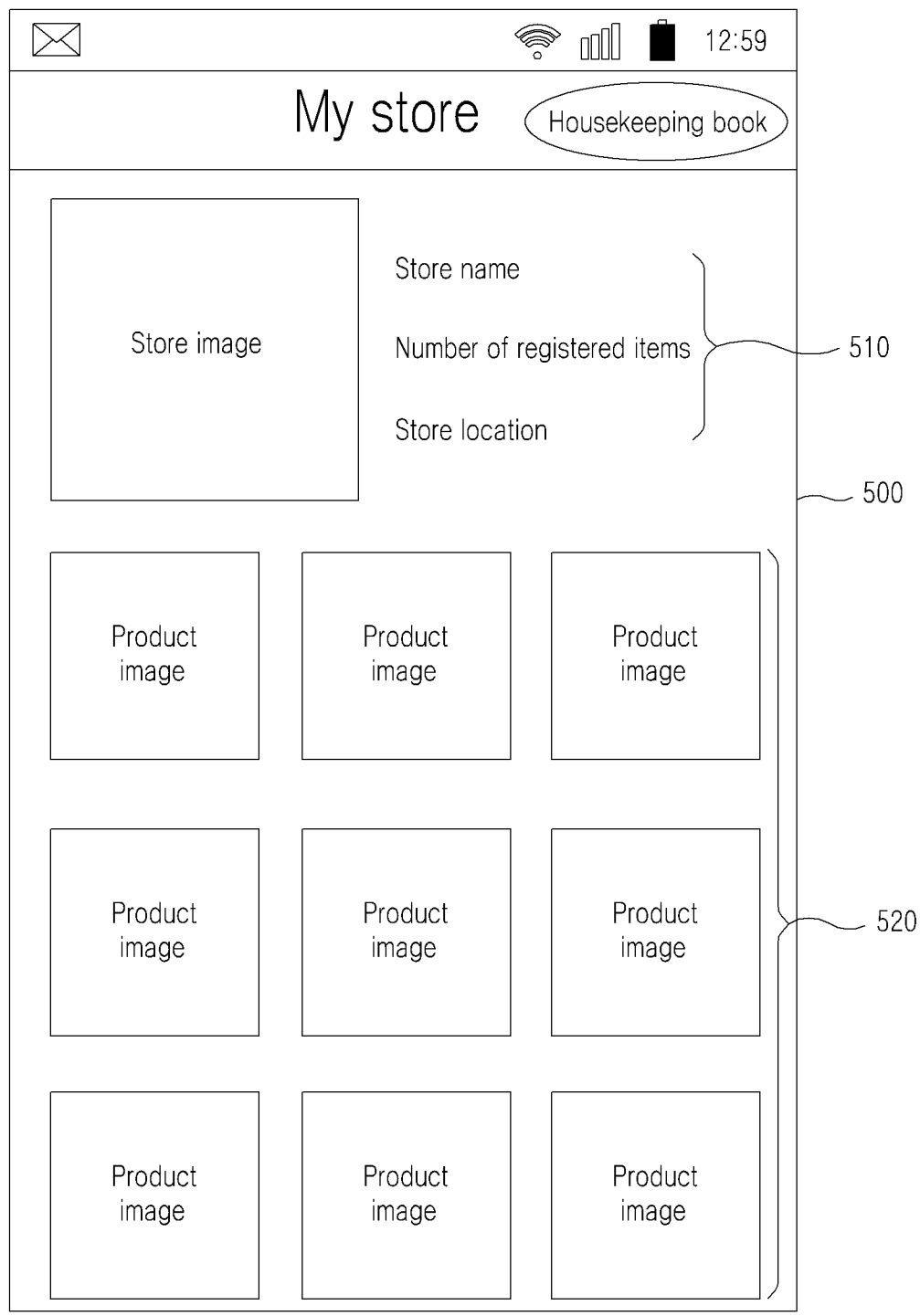

Hereinafter, a process of opening, by a storekeeper, a virtual store according to one embodiment will be described with reference to FIGS. 3 through 5.

Figure 3:
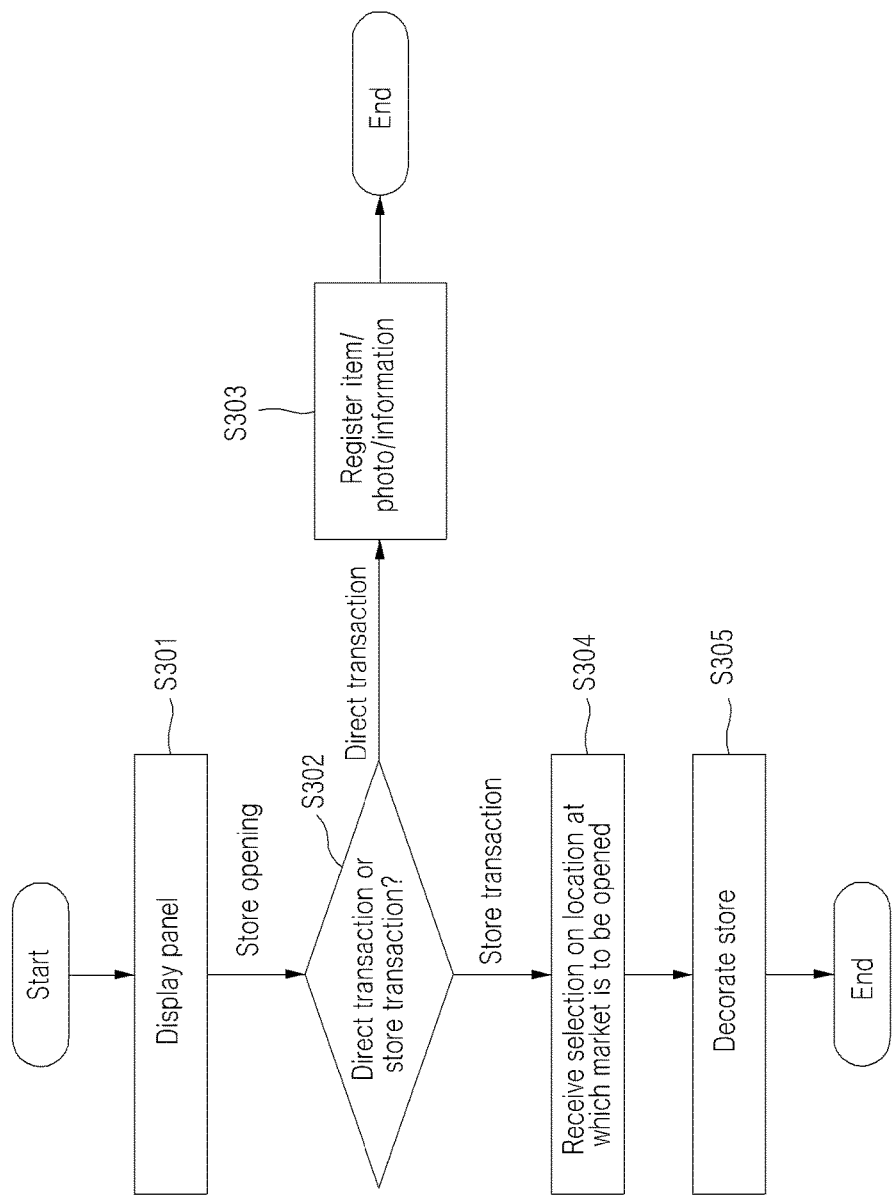
FIG. 3 is a flowchart illustrating a process of opening, by a storekeeper, a virtual store according to one embodiment.

Referring to FIG. 3, in operation S301, a storekeeper terminal may display a service screen provided from a service server 100 for communication with the service server 100 and may display a panel (hereinafter, a "store opening panel") capable of opening a virtual store in response to a request of the storekeeper 101. Here, a menu for opening the virtual store may be displayed on various types of service screens associated with a map service or a location-based service for access to the store opening panel. For example, referring to FIG. 4, an "open a store" menu 410 for opening a virtual store may be activated and displayed at a predetermined location of a service screen 400 for search. Accordingly, in response to an input of the storekeeper 101 on the "open a store" menu 410, the storekeeper terminal may transfer a request of the storekeeper 101 for opening a store to the service server 100.

In operation S302, the storekeeper terminal may receive a selection on whether a virtual store that the storekeeper 101 is to open is a direct transaction market that the storekeeper 101 directly meets with a user 102 and sells a product to the user 102, such as a garage sale or a store transaction market that a transaction is performed through a predetermined procedure associated with a payment or a delivery.

In operation S303, when the storekeeper 101 is to open the direct transaction market, the storekeeper terminal may register store information and product information input from the storekeeper 101 in a direct transaction market form through the store opening panel provided from the service server 100. Here, the service server 100 may register an actual location that matches a current location of the storekeeper terminal, as a location of the direct transaction market.

In operation S304, when the storekeeper 101 is to open the store transaction market, the storekeeper terminal may receive a selection of the storekeeper 101 on a location at which the market is to be opened through the store opening panel provided from the service server. Here, in response to a request of the storekeeper terminal, the service server 100 may provide information on a display frequency for each area displayed on a map service to the storekeeper terminal. As an example, the service server 100 may calculate a display frequency on a map service with respect to each of area units divided into administrative districts and may provide area ranking information based on the calculated display frequency. Further, the service server 100 may sell a location selected by the storekeeper 101 to the storekeeper 101 at the cost of predetermined commission according to a sales policy based on the display frequency on the map service. Accordingly, the storekeeper 101 may verify a display frequency and commission for each area and then may select a location for opening the store transaction market. Here, the location selected or purchased by the storekeeper may be a virtual location present only on a service, irrespective of whether an offline store of the storekeeper 101 is present or irrelevant to an actual location at which the offline store is located. Accordingly, the service server 100 may register the location selected or purchased by the storekeeper as a location of the store transaction market.

The storekeeper terminal may register store information and product information input from the storekeeper to the service server in a store transaction market form. Here, the service server 100 may create a panel (hereinafter, a "market panel") corresponding to the virtual marketplace of the storekeeper 101 having opened the store transaction market. According to one embodiment, the market panel may include a display area on which the storekeeper 101 is capable of editing a display element, for example, a font and an object configuration. FIG. 5 illustrates an example of a market panel 500. Referring to FIG. 5, the market panel 500 may include a store input object 510 for registering store information, for example, a store type, a store name, a store location, an introduction image, and a main URL address, and a product input object 520 for registering product information, for example, a product name, a product image, a product price, and a product URL address. Accordingly, in operation S305, the storekeeper 101 may arbitrarily decorate display elements displayed on the market panel 500 within a predetermined size, to suit the taste of the storekeeper 101. Also, the storekeeper 101 may input store information and product information using the store input object 510 and the product input object 520, respectively. Here, the service server 100 may provide the storekeeper 101 with a housekeeping book function of automatically registering sales details and amounts with respect to product information of the storekeeper through the market panel 500.

The service server 100 may create a market POI indicating the virtual marketplace of the storekeeper 101 with respect to the direct transaction market and the store transaction market. Here, the market POI may be displayed on various types of services associated with the map service or the location-based service. Through the aforementioned store opening process, in addition to a businessman, a user that is not registered as a businessman, however, has passed through a self-authentication procedure of the service server may open a store.

Hereinafter, a process of purchasing a product at a virtual store of a storekeeper 101 according to one embodiment will be described with reference to FIGS. 6 through 9.

Figure 6:
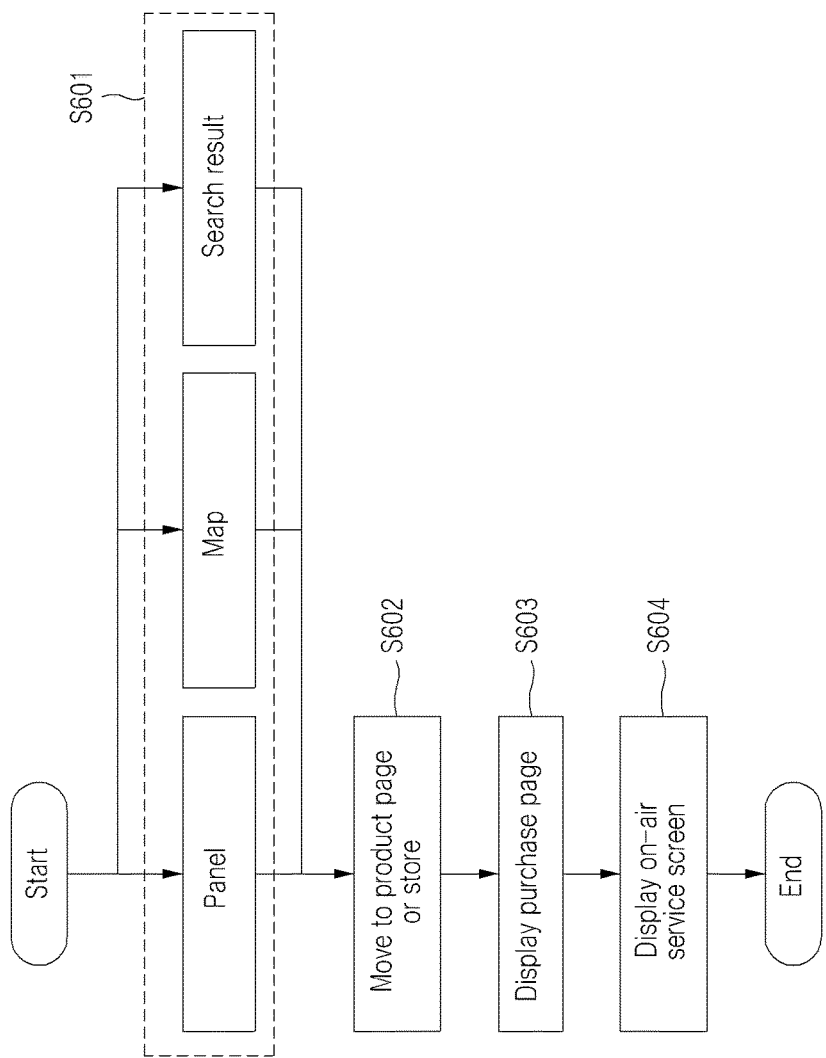
FIG. 6 is a flowchart illustrating a process of purchasing, by a user, a product at a virtual store according to one embodiment.

Referring to FIG. 6, in operation S601, a user terminal may display a service screen provided from a service server 100 for communication with the service server 100 and may display a panel (hereinafter, a "service panel") accessible to a virtual store of a storekeeper in response to a request of a user. Here, the service panel may refer to any type of service screens on which a market POI or a market panel is displayable, such as a market panel corresponding to a virtual marketplace of the storekeeper, a map service screen based on a location of the user 102, and a search result screen about a keyword input from the user 102.

Figure 7:
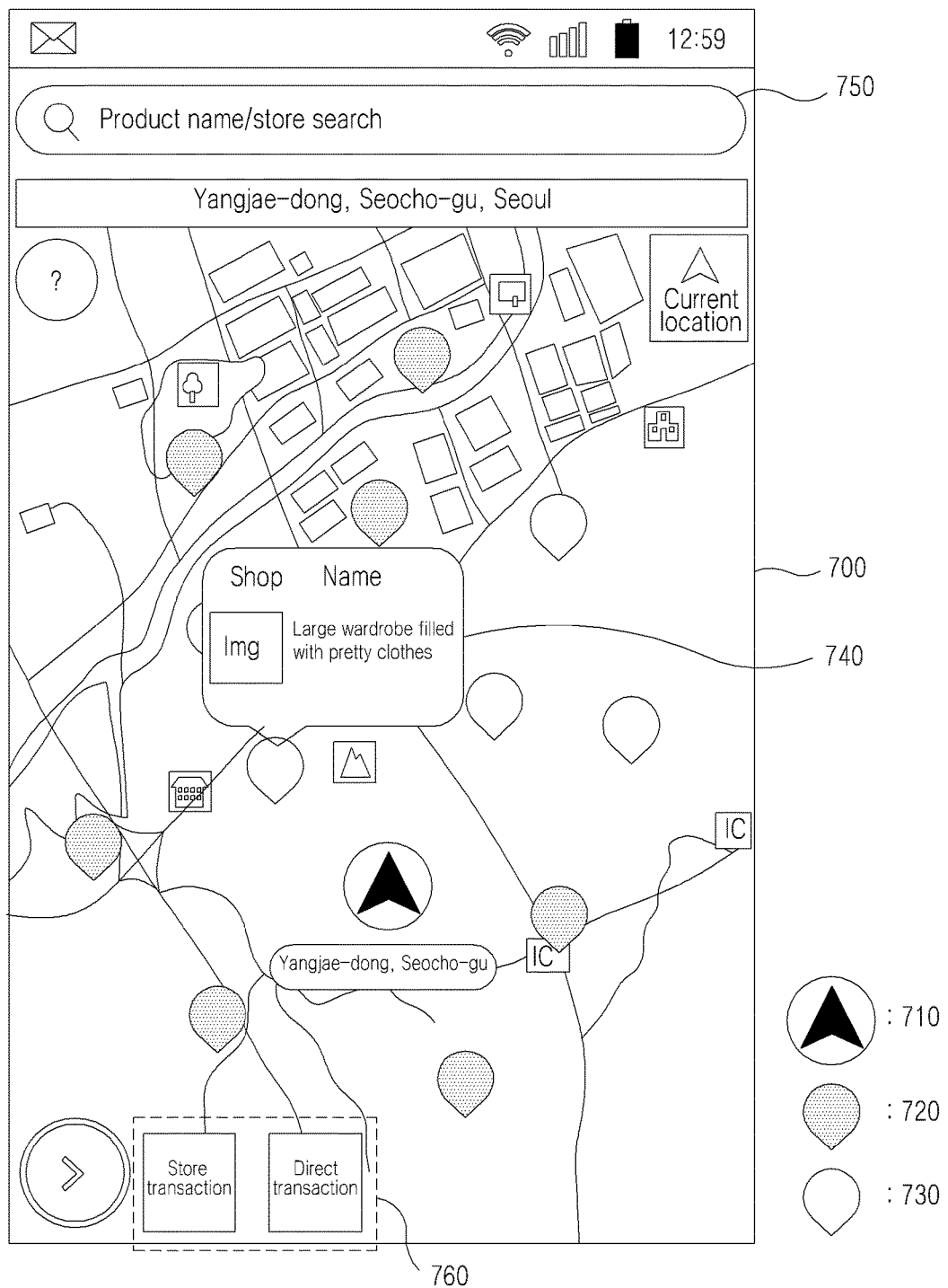
FIG. 7 illustrates an example of a route through which a user is accessible to a virtual store according to one embodiment.

For example, the service server 100 may provide the user 102 with a map screen 700 of FIG. 7 based on a current location of the user terminal. Referring to FIG. 7, market POIs located around a current location 710 of the user are classified into store transaction market POIs 720 and direct transaction market POIs 730 and thereby displayed on the map screen 700. Also, the map screen 700 may further include a search menu 750 capable of searching for a market POI or a product and an icon on/off menu 760 capable of selectively displaying the store transaction market POIs 720 and the direct transaction market POIs 730 on a map. The user 102 of the user terminal may easily view market POIs of another area by changing a scale on the service screen provided from the service server 100 or by moving the map. Also, the user terminal may display a more market POIs through a horizontal scroll and may also display market POIs by applying various sorting criteria, for example, for each store type and for each area, in response to a request of the user.

Accordingly, the user 102 may verify stores opened by other users around a location of the user 102 or garage sale items from among market POIs displayed on the map screen 700. In response to a selection of the user 102 on a predetermined market POI from among the store transaction market POIs 720 and the direct transaction market POIs 730 displayed on the map screen 700, the user terminal may briefly display store information of the selected market POI using a speech bubble function 740.

In operation S602, the user terminal may move to a market panel on which the user 102 is capable of viewing a variety of products registered by the storekeeper 101 or a detail page on which the user 102 is capable of viewing details of a predetermined product, in response to a selection of the user 102. For example, referring again to FIG. 7, in response to a selection of the user 102 on the store transaction market POI 720, the user terminal may move to a corresponding market panel, for example, the market panel 500 of FIG. 5. Also, in response to a selection of the user 102 on the direct transaction market POI 730, the user terminal may move to a corresponding product page.

In operation S603, the user terminal may transfer a user intent for purchasing the predetermined product to the service server 100 and may display a purchase page provided from the service server 100. In operation S604, the user terminal may display an on-air service screen provided from the service server 100 with respect to the purchased product of which payment is also completed. When a product purchase is performed through a route using a market POI, the service server 100 may provide an on-air service for a safe transaction. In detail, the service server 100 may provide a service so that, in the case of a direct transaction, the storekeeper 101 and the user 102 may mutually verify mutual locations until a transaction is completed, and in the case of a delivery transaction, a location of a product being delivered may be verified on a map in real time.

Figure 8:
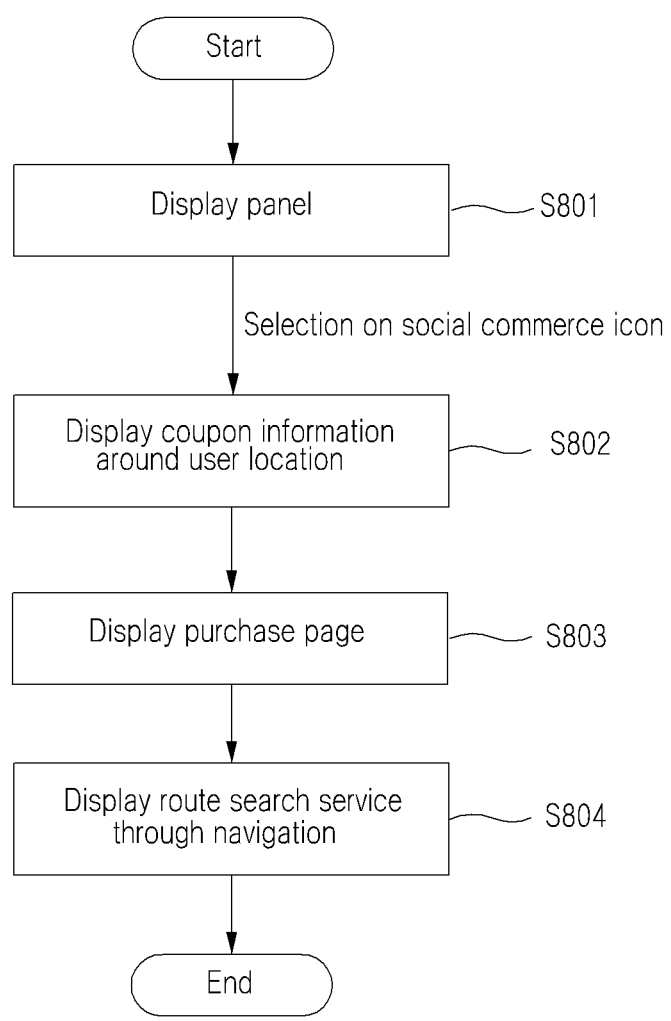
FIG. 8 is a flowchart illustrating a process of purchasing, by a user, coupon information available around a location of the user according to one embodiment.
Figure 9:
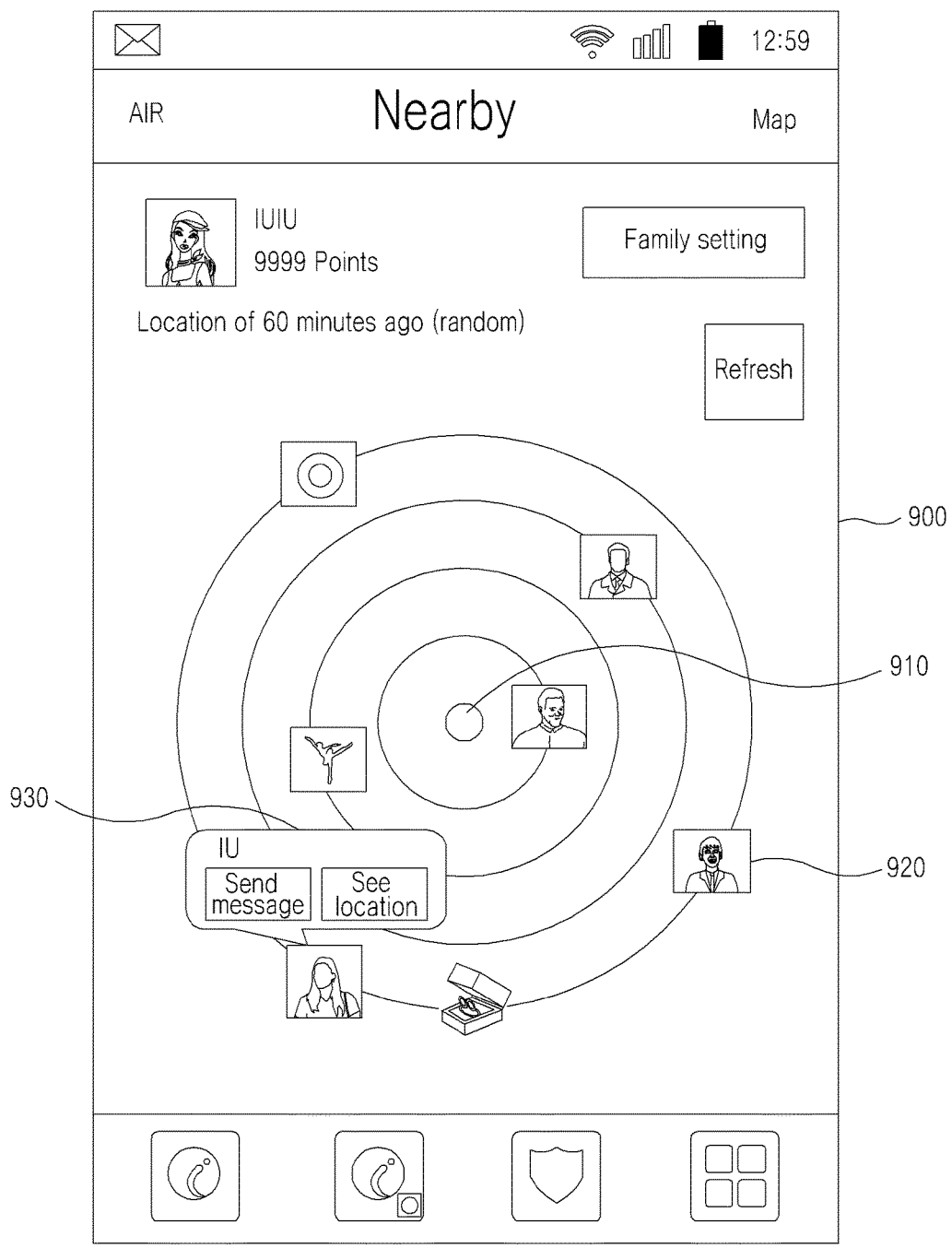
FIG. 9 illustrates an example of a service screen on which coupon information available around a location of a user is displayed according to one embodiment.

Meanwhile, referring to FIG. 8, in response to a request of a user 102 for displaying a coupon on a service screen provided from a service server 100 in operation S801, a user terminal may transfer a request signal to the service server and may display a coupon panel provided from the service server 100 in response thereto in operation S802. Here, the coupon panel may refer to a service screen on which coupon information registered around a user location is displayed. The coupon panel may be configured in a panel form of FIG. 9. Referring to FIG. 9, coupon icons 920 registered at locations within a predetermined radius based on a current location 910 of a user 102 may be displayed on a coupon panel 900. Also, the coupon panel 900 may include a menu box 930 including a "share" menu for sharing a coupon with a friend through a messenger and a "location verification" menu capable of verifying a store location at which a coupon is available.

In operation S803, the user terminal may transfer a user intent for purchasing a predetermined coupon to the service server 100 and may display a purchase page provided form the service server 100. When a coupon purchasing procedure is completed, the user terminal may display a route search service screen provided from the service server 100 in operation S804. In detail, the service server 100 may display a service screen for searching for a route by using, as a destination, a store at which the user is capable of using the purchased coupon. The user 102 may use a search service through a search service screen immediately after purchasing a desired coupon.

The aforementioned processes executed at the service server 100 and the user terminal may include further reduced operations or additional operations. Also, at least two operations thereof may be combined and orders or locations thereof may be changed.

The methods according to embodiments herein may be recorded in non-transitory computer-readable media in a format of program instructions executable through a variety of computer systems. In particular, the embodiments may include non-transitory computer-readable media storing a program, including receiving, from a service server, information on a display frequency for each area displayed on a map service and displaying information on the display frequency, and registering, to the service server, a location selected by a storekeeper based on the display frequency. Here, the service server may create a market POI indicating a virtual marketplace of the storekeeper at the location selected by the storekeeper.

A program according to the present embodiments may be configured as a PC-based program or an application exclusive for a mobile terminal. An app for opening a virtual store based on a map display frequency or providing a virtual store based a location according to the embodiments may be configured in a form of an independently operating program or an in-app form of a predetermined application, for example, a find-a-way program to be operable on the predetermined application.

Figure 10:
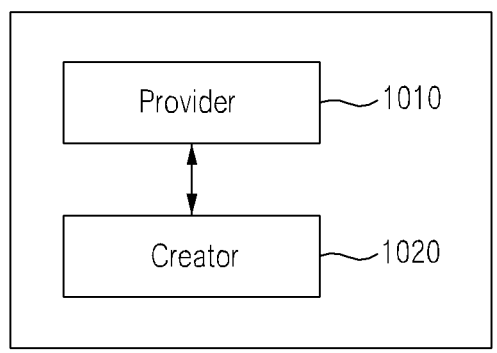
FIG. 10 is a block diagram illustrating a configuration of a service server configured to register a virtual store based on a map display frequency according to one embodiment.
Figure 11:
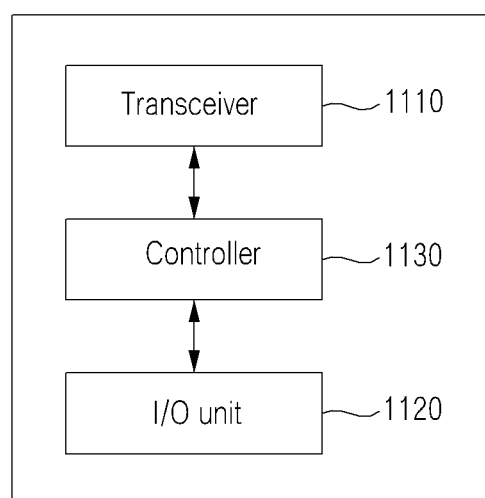
FIG. 11 is a block diagram illustrating a configuration of a terminal configured to open or access a virtual store according to one embodiment.

FIG. 10 is a block diagram illustrating a configuration of a service server 100 configured to register a virtual store based on a map display frequency according to an embodiment of the present invention, and FIG. 11 is a block diagram illustrating a configuration of a terminal 1100 configured to open or access a virtual store according to an embodiment of the present invention. Here, operations of constituent elements of the service server 100 and the terminal 1100 may be expanded based on the location-based transaction processing method described above with reference to FIGS. 1 through 9. Also, a portion of the constituent elements may be omitted or additional constituent elements may be further included. Also, at least two constituent elements may be combined and orders or interacting methods of the constituent elements may be changed.

Referring to FIG. 10, the service server 100 may include a provider 1010 and a creator 1020.

In response to a request of a storekeeper 101 to open a virtual store, the provider 1010 may provide information on a display frequency for each area displayed on a map service to a storekeeper terminal. As an example, the provider 1010 may accumulate a display frequency on a map service with respect to each of area units divided into administrative districts and may provide area ranking information based on the display frequency.

While providing the map service to a user terminal or the storekeeper terminal, the provider 1010 may provide information regarding predetermined bidding processes performed among a plurality of storekeepers or the respective market POIs owned by storekeepers on a map, in order to enable a virtual store to be opened at a point corresponding to a relatively high display frequency on the map.

The creator 1020 may create a market POI indicating a virtual marketplace of the storekeeper 101 at a location selected by the storekeeper 101. Here, the creator 1020 may include a configuration of selling the location selected by the storekeeper 101 to the storekeeper 101 at predetermined commission according to a sales policy based on a display frequency of the selected location on the map service. According to the sales policy, a relatively high sales commission may be set according to an increase in the display frequency. A variety of methods, for example, a sale by bidding and a prior sale, may be employed. Here, the location selected or purchased by the storekeeper 101 may be a location that matches a current location of the storekeeper 101 or an actual location at which an offline store of the storekeeper 101 is located. Also, the location selected or purchased by the storekeeper 101 may be a virtual location present only on a service, irrespective of whether the offline store of the storekeeper 101 is present or irrelevant to the actual location at which the offline store is located. Also, the creator 1020 may create information regarding predetermined bidding processes performed among a plurality of storekeepers or the respective market POIs owned by storekeepers on a map. Further, the creator 1020 may further include a configuration of differentially determining a profit distribution rate among storekeepers based on a display frequency of a location at which a corresponding market POI is created, in the case of selling the location of the market POI.

When creating a market POI, the creator 1020 may create and add an exclusive panel corresponding to a virtual marketplace of the storekeeper 101 with respect to the created market POI. Here, the panel corresponding to the virtual marketplace may be a panel in which the storekeeper is granted with an edition right and is allowed to perform personalization at the convenience of the storekeeper. The panel corresponding to the virtual marketplace may include a display area on which the storekeeper is capable of editing a display element, for example, a font and an object configuration.

Also, the provider 1010 may provide a service for a virtual marketplace to a user using a map service or a location-based service through a corresponding service platform. As an example, the provider 1010 may display, on a service screen based on a location received from a user terminal, a created market POI at a location adjacent to the received location. In this example, in response to a selection of the user on a predetermined market POI among market POIs displayed on the service screen, the service server 100 may switch the service screen to a panel corresponding to the selected market POI, and may display at least one of store information and product information of the storekeeper on the panel. Also, the provider 1010 may display at least one of store information, for example, a store type, a store name, a store location, an introduction image, and a main URL address, and product information, for example, a product name, a product image, a product price, and a product URL address, of the storekeeper 101 through the market POI or the panel with respect to the virtual marketplace. As another example, the provider 1010 may display, on a service screen based on a location received from a user terminal, coupon information registered by a storekeeper at a location adjacent to the received location. Here, the provider 1010 may also provide a route search service with respect to a coupon selected by the user, so that the user may immediately search for a location of a store at which the selected coupon is available.

When the user 102 is to purchase a product, the provider 1010 may provide a payment service in interaction with a server of a financial company, for example, a bank and a card company. In addition, when a product purchase is performed through a route using a market POI, the provider 1010 may allow location information to be shared between a storekeeper terminal and a terminal of the user 102 having purchased a product. Here, the provider 1010 may set a sharing start time and a sharing end time of location information automatically or in response to a selection of the storekeeper or the user 102. Also, the provider 1010 may track a delivery location of the product purchased by the user 102 and may provide the tracked delivery location to the user terminal through an on-air service so that the user 102 may verify the delivery location at any time.

Referring to FIG. 11, the terminal 1100 may be a storekeeper terminal or a user terminal, and may include a transceiver 1110, an input/output (I/O) unit 1120, and a controller 1130.

Description related to an operation of the terminal 1100 serving as the storekeeper terminal will be the same as the description made above with reference to FIGS. 3 through 5, and may be briefed as follows.

The transceiver 1110 may serve to transfer a request or an input of a storekeeper 101 to a service server 100, and to receive a service screen or information provided from the service server 100. In particular, the transceiver 1110 may receive, from the service server 100, information on a display frequency for each area displayed on a map service.

The I/O unit 1120 may include all the configurations for interface with the storekeeper 101, such as an input device and a display device. Basically, the I/O unit 1120 may display the service screen provided from the service server 100. In particular, the I/O unit 1120 may display information on the display frequency for each area received through the transceiver 1110. Also, the I/O unit 1120 may display information provided from the service server 100, in order to enable a virtual store to be opened at a point corresponding to a relatively high display frequency on a map. For example, the provided information may be information regarding predetermined bidding processes performed among a plurality of storekeepers or the respective market POIs owned by storekeepers on the map.

The I/O unit 1120 may receive a selection of a storekeeper 101 at a location at which the storekeeper 101 is to open a virtual store based on the display frequency for each area. Accordingly, the transceiver 1110 may transfer the location selected by the storekeeper 101 to the service server 100 as a location at which the virtual store is requested to be opened. Also, the I/O unit 1120 may receive, from the storekeeper 101, store information, for example, a store type, a store name, a store location, an introduction image, and a main URL address, and product information, for example, a product name, a product image, a product price, and a product URL address. The transceiver 1110 may transfer, to the service server 100, the store information and the product information input from the storekeeper.

The controller 1130 may control the overall operation required for the storekeeper terminal by interpreting a program command of an application for opening a virtual store based on a map display frequency. The controller 1130 may control all the data processing required to operate the transceiver 1110 and the I/O unit 1120. That is, the controller 1130 may perform a function of controlling information, for example, information on a display frequency for each area, received from the service server 100 through the transceiver 1110 to be processed and controlling the processed information to be provided to the user through the I/O unit 1120, and a function of controlling data, for example, location information associated with a request for opening a virtual store, processed based on the input information to be transferred to the service server.

Description related to an operation of the terminal 1100 serving as the user terminal will be the same as the description made above with reference to FIGS. 6 through 9, and may be briefed as follows.

The transceiver 1110 may serve to transfer a request or an input of a user 102 to a service server 100, and to receive a service screen or information provided from the service server 100. In particular, the transceiver 1110 may transfer a current location of a terminal or a location designated by the user to the service server 100, and may receive, from the service server 100, service screens based on the location transferred from the terminal.

The I/O unit 1120 may include all the configurations for interface with the user 102, such as an input device and a display device. Basically, the I/O unit 1120 may display the service screen provided from the service server 100. In particular, the I/O unit 1120 may display a service panel accessible to virtual stores located around the user location, provided from the service server. Here, the service panel may refer to any type of service screens on which a market POI or a market panel is displayable, such as a market panel corresponding to a virtual marketplace of the storekeeper, a map service screen based on a location of the user, and a search result screen about a keyword input from the user. Also, the I/O unit 1120 may display a purchase page provided from the service server 100 in response to a purchase intent of the user. Further, the I/O unit 1120 may display an on-air service screen provided from the service server with respect to the purchased product. Here, the on-air service screen may indicate a service screen capable of guaranteeing a safe transaction between the storekeeper and the user 102, for example, a screen on which the storekeeper 101 and the user 102 may share mutual locations until a transaction is completed and a screen on which the user is capable of verifying a location of the purchased product on a map in real time.

The controller 1130 may control the overall operation required for the user terminal by interpreting a program command of an application for providing a virtual store based on a location. The controller 1130 may control all the data processing required to operate the transceiver 1110 and the I/O unit 1120. That is, the controller 1130 may perform a function of controlling data processed based on information input through the I/O unit 1120 to be transferred to the service server 100 and a function of controlling information received from the service server 100 through the transceiver 1110, for example, a service panel for virtual stores, a purchase page for purchasing a product, and an on-air service screen for a purchased product, to be provided to the user through the I/O unit 1120.

As described above, according to embodiments herein, any user may easily open a virtual store and sell a product, and a storekeeper 101 may decorate a store of the storekeeper 101 to suit the taste of the storekeeper 101 on a virtual space. In particular, according to embodiments herein, information on a location corresponding to a relatively high display frequency on a map may be provided and thus, a storekeeper 101 may select a virtual location and open a store at the location corresponding to the relatively high display frequency. Further, a differential profit distribution model based on a display frequency may be configured. Also, according to embodiments herein, a user 102 may immediately verify products being sold around the user based on a location of the user. In addition, products may be sorted for each search or item and thus, the user 102 may easily verify and purchase a desired product. Also, according to the embodiments herein, in the case of performing a product transaction, it is possible to support a safe transaction using an on-air service. In detail, a service may be provided so that, in the case of a direct transaction, a seller and a purchaser may verify mutual locations until a transaction is completed, and in the case of a delivery transaction, a location of a product being delivered may be verified on a map in real time.

Also, according to the embodiments herein, to open a virtual store at a point corresponding to a relatively high display frequency on a map provided from a service server 100, a storekeeper 101 may transmit, to the service server 100, a request for opening the virtual store at a point corresponding to the relatively high display frequency using a predetermined sales method, for example, a sale by bidding and a prior sale, through a storekeeper terminal. In response to the request, the service server 100 may locate a market POI of the storekeeper 101 at the point corresponding to the relatively high display frequency according to the predetermined sales method, and may transmit a map service and information on the map service and the market POI to the storekeeper terminal. The storekeeper terminal may provide the user 102 with the map service and information on the market POI received from the service server.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described example embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A location-based transaction processing method, the method comprising:
    providing information on a display frequency for each area displayed on a map of a map service to a storekeeper terminal of a storekeeper; and
    creating a market point of interest (POI) indicating a virtual marketplace of the storekeeper at a location on the map selected by the storekeeper terminal based on the display frequency; and
    providing a user terminal with the map service in which the created market POI is displayed on the map of the map service,
    wherein creating the market POI includes receiving, from the storekeeper terminal, a selection of the location on the map where the market POI is created, the location being selected independently of a geographical location of an offline store of the storekeeper and a current location of the storekeeper terminal, and
    wherein the virtual marketplace provides an online sales service for at least one product associated with the storekeeper, and the online sales service is provided to the user terminal for display on the user terminal in response to the market POI being selected by the user terminal.

2. The method of claim 1, wherein the providing of the information on the display frequency comprises providing area ranking information according to the display frequency to the storekeeper terminal.

3. The method of claim 1, wherein the location on the map selected by the storekeeper terminal is a virtual location sold to the storekeeper in accordance with a sales policy based on the display frequency.

4. The method of claim 1, further comprising:
displaying information on the virtual marketplace through the market POI.

5. The method of claim 1, wherein the creating of the market POI comprises creating a panel corresponding to the virtual marketplace with respect to the market POI.

6. The method of claim 5, wherein the panel is a display area on which the storekeeper is capable of editing a display element.

7. The method of claim 5, further comprising:
displaying at least one of information on the virtual marketplace and information on the product registered by the storekeeper on the panel.

8. The method of claim 5, wherein the providing the user terminal with the map service comprises:
displaying, on a service screen based on a location received from a user terminal, the market POI created at the location on the map adjacent to the received location; and
displaying at least one of information on the virtual marketplace and information of the product registered by the storekeeper on the panel in response to a selection on the market POI through the user terminal.

9. The method of claim 5, further comprising:
receiving, from a user terminal, a selection on a panel displayable for the user terminal among panels created for the respective market POIs.

10. The method of claim 1, wherein the providing the user terminal with the map service comprises:
displaying, on a service screen based on a location received from the user terminal, the market POI created at the location on the map adjacent to the received location.

11. The method of claim 1, wherein the providing the user terminal with the map service comprises:
displaying, on a service screen based on a location received from a user terminal, coupon information registered by the storekeeper at a location adjacent to the received location.

12. The method of claim 1, further comprising:
sharing location information between the storekeeper terminal and the user terminal having purchased the product in response to a success in a product purchase for the product through a route using the market POI.

13. The method of claim 1, further comprising:
tracking a delivery location of the product and providing the tracked delivery location to the user terminal of having purchased the product in response to a success in a product purchase for the product through a route using the market POI.

14. The method of claim 1, wherein profits earned with respect to the market POI are differentially distributed based on a display frequency corresponding to the location at which the market POI is created.

15. A location-based transaction processing method, the method comprising:
receiving, from a service server, information on a display frequency for each area displayed on a map of a map service, and displaying information on the display frequency;
registering a location on the map selected by a storekeeper to the service server based on the display frequency, wherein the service server creates a market point of interest (POI) indicating a virtual marketplace of the storekeeper at the location on the map selected by the storekeeper based on the display frequency; and
registering, to the service server, information on the virtual marketplace to be displayed through the market POI in response to an input of the storekeeper,
wherein the map service in which the created market POI is displayed on the map of the map service is provided to a user terminal,
wherein the market POI is created in response to receiving, from a storekeeper terminal of the storekeeper, a selection of the location on the map where the market POI is created, the location being selected independently of a geographical location of an offline store of the storekeeper and a current location of the storekeeper terminal, and
wherein the virtual marketplace provides an online sales service for at least one product associated with the storekeeper, and the online sales service is provided to the user terminal for display on the user terminal in response that the market POI being selected by the user terminal.

16. The method of claim 15, wherein the location selected by the storekeeper is a virtual location sold to the storekeeper in accordance with a sales policy based on the display frequency.

17. The method of claim 15, wherein the service server creates a panel corresponding to the virtual marketplace with respect to the market POI, and
the method further comprises:
registering, to the service server, information on the product to be displayed on the panel in response to the input of the storekeeper.

18. The method of claim 17, wherein the panel is a display area on which the storekeeper is capable of editing a display element.

19. A location-based transaction processing method, the method comprising:
transmitting a current location or a location input from a user to a service server; and
receiving, from the service server, a service screen including a map based on the current location or the location input from the user and a market point of interest (POI) to be displayed on the map, and displaying the market POI on the map,
wherein the market POI indicates a virtual marketplace of a storekeeper and is created by the service server at a location on the map selected by the storekeeper based on a display frequency for each area displayed on a map service,
wherein the market POI is created in response to receiving, from a storekeeper terminal of the storekeeper, a selection of the location on the map where the market POI is created, the location being selected independently of a geographical location of an offline store of the storekeeper and a current location of the storekeeper terminal, and
wherein the virtual marketplace provides an online sales service for at least one product associated with the storekeeper, and the online sales service is provided to the user terminal for display on the user terminal in response to the market POI being selected by the user terminal.

20. The method of claim 19, wherein the service server creates a panel corresponding to the virtual marketplace with respect to the market POI, and
the method further comprises:
receiving, from the service server, information on the product registered by the storekeeper and displaying the product information on the panel in response to a selection of the user on the market POI.

21. The method of claim 19, wherein the receiving and displaying of the market POI comprises receiving, from the service server, coupon information registered by the storekeeper at a location adjacent to the current location or the location input from the user, and displaying the coupon information on the service screen.

22. The method of claim 19, further comprising:
receiving, from the service server with respect to the product purchased by the user through a route using the market POI, terminal location information of the storekeeper having sold the product, and displaying the terminal location information on the service screen.

23. The method of claim 19, further comprising:
receiving, from the service server with respect to the product purchased by the user through a route using the market POI, a delivery location of the product, and displaying the delivery location on the service screen.

* * * * *